United States Patent [19]

Martin et al.

[11] 4,284,613

[45] Aug. 18, 1981

[54] PROCESS FOR AMMONIATING PHOSPHORIC ACID

[75] Inventors: Donald M. Martin; Peter A. Rowe, both of Ipswich, England

[73] Assignee: Fisons Limited, London, England

[21] Appl. No.: 81,817

[22] Filed: Oct. 4, 1979

[30] Foreign Application Priority Data

Oct. 7, 1978 [GB] United Kingdom ............... 39732/78

[51] Int. Cl.³ ............................................. C01B 25/28
[52] U.S. Cl. ..................................... 423/310; 423/313
[58] Field of Search ................................ 423/310, 313

[56] References Cited

U.S. PATENT DOCUMENTS

| 3,419,378 | 12/1968 | Kearns | 423/313 |
| 3,974,263 | 8/1976 | Crerar et al. | 423/310 |
| 4,009,245 | 2/1977 | Hudson et al. | 423/313 |

Primary Examiner—Earl C. Thomas
Assistant Examiner—Wayne A. Langel
Attorney, Agent, or Firm—Wenderoth, Lind & Ponack

[57] ABSTRACT

A process which comprises reacting ammonia with phosphoric acid in a reaction vessel to form a reaction mixture comprising ammonium phosphate characterized in that the reaction mixture is allowed to foam whereby there is formed a foaming reaction mixture comprising steam and ammonium phosphate; and in that steam and ammonium phosphate are discharged from the reaction vessel through a common outlet. Preferably the ammoniation is carried out under pressure and the foam reaction mixture is discharged via a spray nozzle into a zone of lower pressure where water is evolved spontaneously, e.g. by flash evaporation as the product is sprayed, to give a solid particulate product.

8 Claims, No Drawings

PROCESS FOR AMMONIATING PHOSPHORIC ACID

The present invention relates to a process, notably a process for preparing ammonium phosphates.

In our British Pat. No. 1081296 we have described and claimed a process for preparing solid ammonium phosphates which comprises a reacting phosphoric acid, for example wet process phosphoric acid containing less than 60% $P_2O_5$ by weight, with ammonia gas under superatmospheric pressure to give a fluid ammonium phosphate solution at its boiling point containing 4% to 15% by weight of water, and subsequently expelling the resulting fluid ammonium phosphate solution into a zone at ambient pressures thereby reducing its water content and giving a solid product. Such a process is conventionally carried out in a stirred reactor with a steam outlet and a separate product outlet. The steam from the process is a valuable energy source and the reaction vessel is designed so as to facilitate separation of the steam from the reaction mixture, e.g. by providing a large steam disengagement zone above the reaction mixture. Furthermore, it has been considered essential to avoid the use of certain phosphoric acids which could form foams due to impurities therein since the formation of a foam phase in the reaction vessel would have hindered efficient disengagement of the steam from the reaction mixture.

Surprisingly, we have now found that the reaction mixture during the ammoniation of wet process phosphoric acid can with advantage exist as a foam of reaction mixture and steam and not as two distinct phases. Such a foam readily lends itself to discharge through a single outlet. Discharging the reaction mixture together with the steam would have been expected (on the hitherto held belief that they existed as two separate and distinct phases) to have been impractical and difficult to control. Furthermore, since the steam is evolved at a larger volume rate than the fluid reaction product, it would have been expected that the material discharging through a common outlet would have been in the form of bursts of steam with intermittent batches of fluid. Such a discharge would have been expected to lead to erratic variations of pressure within the reaction vessel and uneven discharge of the product.

Surprisingly, the foam reaction mixture can be readily discharged through a single outlet with simple controls and can be sprayed satisfactorily to give a dry product. The steam in the foam reduces the risk of premature solidification of the foam due to cooling before spraying. The steam also aids spraying of the product and may inhibit solids build-up on the spray nozzle.

The ability to discharge the steam with the fluid reaction mixture has the advantage that there is no longer need to provide a steam disengagement zone (saving in capital cost of the plant) and also enables one to use a wider range of phosphoric acids than had hitherto been considered possible. Also, there is no need to incorporate foam breakers or similar devices into the reaction vessel nor to incorporate anti-foaming agents into the reaction mixture.

Accordingly the present invention provides a process which comprises reacting ammonia with phosphoric acid in a reaction vessel to form a reaction mixture comprising ammonium phosphate characterised in that the reaction mixture is allowed to foam whereby there is formed a foaming reaction mixture comprising steam and ammonium phosphate; and in that steam and ammonium phosphate are discharged from the reaction vessel through a common outlet. Preferably the ammoniation is carried out under pressure and the foam reaction mixture is discharged via a spray nozzle into a zone of lower pressure where water is evolved spontaneously, e.g. by flash evaporation as the product is sprayed, to give a solid particulate product.

The term 'foam' is used herein and in the claims to denote that, due to the presence of steam therein, the density of the reaction mixture is less than 70%, preferably 25 to 50%, of the density of a similar reaction mixture containing no steam therein.

Within reason, the reaction mixture can be more highly foamed than indicated. However, increasing the level of foaming reduces the through-put of the reaction vessel and may result in a commercially unacceptable reduction in plant capacity.

The ammoniation of the phosphoric acid is preferably carried out by passing gaseous ammonia into wet process phosphoric acid in an agitated reactor. The agitation can be achieved mechanically and/or by thermal convection circulation in a reaction vessel. As indicated above, the reaction is preferably carried out under pressure, e.g. at from 0.5 to 5 kg/cm² gauge. Thus, for example the ammoniation is carried out in the manner described in our British Pat. No. 1081296 or variations thereof, e.g. British Pat. No. 1191497 by using a stirring or agitated tank reacting vessel.

The phosphoric acid for present use will typically be a wet process phosphoric acid. Since it is desired to form a foaming reaction mixture, it is not necessary to use only those acids which have been treated to reduce the foaming tendancies thereof as hitherto. Thus, suitable acids for present use include those obtained from rocks from the North African and U.S.A. deposits, e.g. Morocco, Algeria, Senegal, Tunisia, Sahara or Florida. If desired a foaming agent can be incorporated into the acid (during or after its manufacture) to aid foam formation during ammoniation.

The outlet from the reaction mixture takes any appropriate form. However, we have found that the use of a stand pipe type outlet offers advantages in that the outlet also acts as a weir to maintain the level of reaction mixture in the vessel at a desired height. Preferably, the stand pipe has a V notch type weir. The outlet is also provided with means for retaining the desired pressure within the reactor. This means is, for example, a control valve on the reactor discharge activated by the reactor pressure. Alternatively, where the reaction mixture is to be sprayed into a zone of lower pressure, e.g. into a void tower or onto particles in a granulator, an adjustable orifice in the spray nozzle can be used to provide the necessary back pressure to maintain the desired pressure in the reaction vessel. In a further alternative, steam may be injected upstream of the spray nozzle. Due to the fact that the mixture being discharged from the reactor contains more steam than with a conventional process, the mass flow of air in the zone of lower pressure may be reversed. Thus, for example the air flow in a void tower may be down the tower rather than up. It may therefore be necessary to put any cyclones or other effluent treatment at the base of the tower.

The invention will now be illustrated by the following Examples in which all parts and percentages are by weight unless specified otherwise.

EXAMPLE 1

Moroccan wet process phosphoric acid (50% $P_2O_5$) was reacted with liquid ammonia in a stirred reactor operated at a temperature of 160°–170° C. and at a pressure of 2.1 bar achieved by appropriate sizing of the nozzle through which the product was discharged and/or by injecting further steam into the reaction vessel or the spray nozzle. The product was discharged at a pH of 4.0 into a void tower operating at ambient temperature and pressure to give a particulate solid product. The product was discharged from the reaction vessel through a single stand pipe outlet. Satisfactory operation was achieved at production rates of between 3 and 12 tons per hour, even though the reaction mixture was in the form of a foam having a density approximately 50% of that of an all liquid reaction mixture, as determined by level sensors in the reaction vessel.

EXAMPLE 2

A batch process was carried out in a thermosyphon reaction vessel under the same conditions as in Example 1 using acids derived from Florida rock and from Yousoufia rock. The foaming reaction mixtures were sprayed into a void tower as in Example 1 via a standpipe outlet from the reaction vessel. In the case of Florida rock the density of the foaming reaction mixture was 40% of that of an all liquid reaction mixture and in the case of Yousoufia rock the density of the foam fluctuated between 10 and 30% of that of an all liquid reaction mixture.

We claim:

1. A process for ammoniating phosphoric acid which comprises reacting ammonia with phosphoric acid under pressure in an agitated tank reaction vessel to form a reaction mixture comprising ammonium phosphate characterised in that the reaction mixture is circulated within the reaction vessel and allowed to foam whereby there is formed a foaming reaction mixture comprising steam and ammonium phosphate; and in that steam and ammonium phosphate are discharged from the reaction vessel through a common outlet which outlet has means for controlling pressure within the reaction vessel.

2. A process as claimed in claim 1 characterised in that the common outlet is provided by a stand pipe in the reaction vessel.

3. A process as claimed in claim 2 characterised in that the stand pipe discharges the steam and ammonium phosphate via a spray nozzle.

4. A process as claimed in claim 1 characterised in that the foaming reaction mixture has a bulk density of 25 to 50% of the density of the liquid phase of the foamed reaction mixture.

5. A process as claimed in claim 1 characterised in that the phosphoric acid is a wet process phosphoric acid which has not been treated so as to reduce the foaming tendancies thereof.

6. A process as claimed in claim 1 characterised in that the reaction mixture is discharged into a zone at lower pressure whereby water is evolved spontaneously from the reaction mixture to give a solid particulate product.

7. A process as claimed in claim 1 characterised in that the reaction is carried out under a pressure from 0.5 to 5 kg/cm² gauge.

8. A process as claimed in claim 1 characterised in that the means for controlling pressure is a control valve for dispensing the reaction mixture located at the common outlet, which control valve is activated by the internal reaction pressure.

* * * * *